United States Patent
Kimikawa et al.

(10) Patent No.: US 6,892,385 B2
(45) Date of Patent: May 10, 2005

(54) INFORMATION RECORDING MEDIUM CONVEYOR

(75) Inventors: Yuichi Kimikawa, Saitama-ken (JP); Nobutaka Kawakita, Saitama-ken (JP); Takeshi Matsumoto, Saitama-ken (JP); Katsunori Tamamura, Saitama-ken (JP); Takao Yoshida, Saitama-ken (JP); Yasuhiro Shinkai, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 183 days.

(21) Appl. No.: 10/431,510

(22) Filed: May 8, 2003

(65) Prior Publication Data

US 2003/0210618 A1 Nov. 13, 2003

(30) Foreign Application Priority Data

May 9, 2002 (JP) ....................... 2002-133893

(51) Int. Cl.[7] .............................................. G11B 33/02
(52) U.S. Cl. ..................... 720/631; 369/30.36
(58) Field of Search .................. 720/626, 631, 720/620, 621, 622; 369/30.36

(56) References Cited

U.S. PATENT DOCUMENTS

| | | | |
|---|---|---|---|
| 4,674,080 A | * | 6/1987 | Higuchi et al. ............. 720/626 |
| 4,733,314 A | * | 3/1988 | Ogawa et al. ............ 360/99.07 |
| 4,995,027 A | * | 2/1991 | Aoyagi et al. .............. 720/626 |
| 5,136,570 A | * | 8/1992 | Takai et al. ................. 720/624 |
| 6,243,347 B1 | | 6/2001 | Kawana et al. ............ 369/77.1 |
| 6,577,579 B1 | * | 6/2003 | Kakuta et al. .............. 720/622 |

FOREIGN PATENT DOCUMENTS

| | | |
|---|---|---|
| EP | 1 089 272 A2 | 4/2001 |
| WO | WO 93/18513 | 9/1993 |

* cited by examiner

*Primary Examiner*—A. J. Heinz
*Assistant Examiner*—Mark Blouin
(74) *Attorney, Agent, or Firm*—Arent Fox

(57) ABSTRACT

During an ejecting or unloading operation of an information recording medium by a conveying roller, if detection signals are output from detecting sensors indicating that the object being ejected or unloaded has already been discharged from an insertion hole although it has not, then the insertion hole is closed by the door. If, for some reasons, the door fails to close the insertion hole within a predetermined time, the conveying roller performs a forcible ejecting operation, whereby the object left inside is forcibly ejected to the outside. Thus, ejection or unloading of a medium is carried out without failure.

15 Claims, 10 Drawing Sheets

LOADING/UNLOADING DIRECTION

FIG.4 A    FIG.4 B
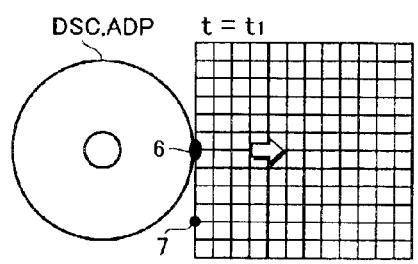 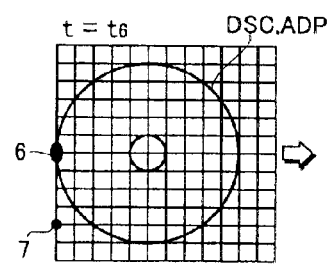

FIG.4 D    FIG.4 E
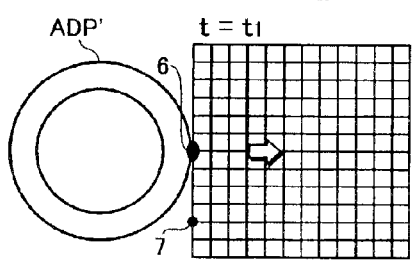 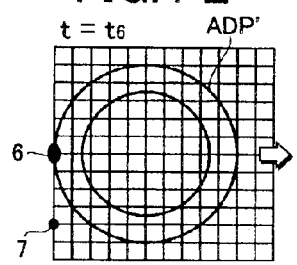

FIG.4 G    FIG.4 H
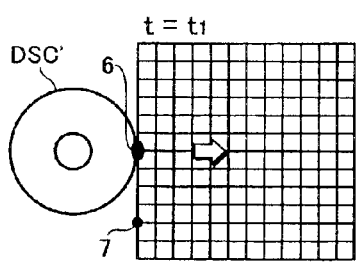 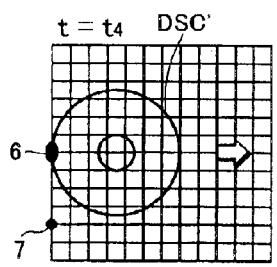

INFORMATION RECORDING MEDIUM CONVEYOR

BACKGROUND OF THE INVENTION

The present invention relates to a system for conveying information recording media such as compact discs (CDs) and digital versatile discs (DVDs) into and out of an information recording/reproducing device.

The present application claims priority from Japanese Patent Application No. 2002-133893, the disclosure of which is incorporated herein by reference.

Information recording/reproducing devices such as digital audio systems designed for playing information recording media such as CDs or DVDs (hereinafter referred to generally as "discs") are normally provided with a conveyor having an auto loading function, which loads a disc automatically into or out of the information recording/reproducing device.

It is essential for such conveyor to be able to load or unload a disc without failure which can be used for the information recording/reproducing device.

Basically, 12 cm diameter discs ("large discs") DSC shown in FIG. 6A are standardized for CDs and DVDs, but there are also smaller, 8 cm diameter discs DSC' as shown in FIG. 6B for CDs, which are also standardized.

There has also been developed a ring-shaped auxiliary component called an adaptor, which has a diameter of about 12 cm. As shown in FIG. 6C, an adaptor ADP' has a coupling portion with a circular hole for coupling with a small disc DSC'. As shown in FIG. 6D, when attached to the disc, it forms a quasi-disc ADP which complies with the standard disc size of the large discs DSC.

An information recording/reproducing device for playing such a large disc DSC and a disc ADP with an adaptor which complies with the standard disc size must have a conveyor capable of identifying these discs DSC and ADP and loading/unloading them without failure, and of ejecting any foreign matter other than the acceptable discs. Such a conveyor, for example, has a configuration shown in FIG. 6E.

The information recording medium conveyor shown in FIG. 6E is provided with a conveying roller DRV for conveying a disc by rotational drive force, an optical sensor PD for detecting the track of the disc DSC or ADP passing along its center axis, a contact sensor MS for detecting the passage of the disc DSC or ADP by making a sliding contact with a circumferential portion of the disc, and a microprocessor (not shown) for controlling the rotation of the conveying roller DRV in accordance with the detection signals Sa and Sb output from the optical sensor PD and the contact sensor MS, respectively.

The optical sensor PD outputs the detection signal Sa of either a logic "H" or "L." If it detects a disc face of a large disc DSC or a disc ADP with an adaptor, it outputs the logic "H," whereas if it detects a portion other than the disc DSC or ADP or a portion of the clamping hole through which light passes, it outputs the logic "L."

The contact sensor MS is spaced away from the optical sensor PD by a certain distance which is shorter than the radius of the large disc DSC or the disc ADP with an adaptor. It is supported on a spring SP or the like attached to a portion of the chassis of the information recording/reproducing device, so that it is resiliently biased towards the optical sensor PD. Therefore, when the disc DSC or ADP passes through against the biasing force of the spring SP, the contact sensor MS makes a sliding contact with the circumference of the disc DSC or ADP, thereby detecting the passage of the disc.

The contact sensor MS outputs a detection signal Sb, which is either a logic "L," during it is in sliding contact with the circumference of the disc, or a logic "H," when it makes no contact therewith.

When a large disc DSC or a disc ADP with an adaptor is inserted through an insertion hole (not shown), the optical sensor PD detects its distal end, whereupon, following an instruction from the microprocessor, the conveying roller DRV rotates in forward direction for loading the disc onto a tray TR arranged at a predetermined location behind the conveying roller DRV, where information recording/reproducing is carried out by an optical pickup system.

When unloading, the microprocessor instructs the conveying roller DRV to rotate in reverse direction, whereby the large disc DSC or a disc ADP with an adaptor which has been played and left in the tray TR is discharged from the insertion hole noted above.

FIG. 7A to FIG. 7F illustrate the changes in the position of the disc DSC or ADP being loaded onto the tray TR relative to the optical sensor PD and the contact sensor MS, and FIG. 7G is a diagram showing the changes of the detection signals Sa and Sb in time sequence t1 to t6.

FIG. 8A to FIG. 8F illustrate the changes in the position of the adaptor ADP' relative to the optical sensor PD and the contact sensor MS, in an imaginary case in which the user has inserted only the adaptor ADP' by mistake and this adaptor ADP' is loaded onto the tray TR by the conveying roller DRV. FIG. 8G is a diagram showing the changes of the detection signals Sa and Sb.

FIG. 9A to FIG. 9D illustrate the changes in the position of the small disc DSC' relative to the optical sensor PD and the contact sensor MS, in an imaginary case in which the user has inserted the small disc DSC' by mistake and this disc DSC' is loaded onto the tray TR by the conveying roller DRV. FIG. 9E is a diagram showing the changes of the detection signals Sa and Sb.

The microprocessor constantly monitors the changes of the detection signals Sa and Sb during the loading operation by the conveying roller DRV. If the microprocessor determines that the detection signals are changing in a predetermined, normal sequence shown in FIG. 7G, then it decides that a normal disc DSC or a disc ADP with an adaptor is being loaded in a normal procedure, and continues the loading of the same toward the tray TR.

However, if the detection signals Sa and Sb are changing differently from the normal sequence shown in FIG. 7G, e.g., if they are changing in the sequence shown in FIG. 8G or FIG. 9E, the microprocessor breaks off the loading operation and makes the conveying roller DRV reverse its rotating direction to forcibly discharge the small disc DSC', adaptor ADP', or whatever is inside, from the insertion hole, so as to prevent further troubles.

When unloading a large disc DSC or a disc ADP with an adaptor mounted on the tray TR, the microprocessor constantly monitors the detection signals Sa and Sb. If the signals are changing in the normal sequence which is the reverse sequence from t6 to t1 shown in FIG. 7G, the microprocessor decides that the unloading operation is being carried out successfully, and if not, it carries out an error recovery action such as reporting to the user the occurrence of an abnormality.

As described above, the conventional information recording medium conveyor is designed such that the microprocessor monitors the changes of detection signals Sa and Sb so as to ensure that loading or unloading is carried out appropriately. However, since there may be an unexpected situation brought about by the user's unpredicted action, the conveyor is desired to have a feature which can prevent troubles resulting from such unexpected situation.

For example, in the conventional conveyor, when an adaptor ADP' alone is inserted by the user by mistake, the microprocessor detects an abnormality in the sequence of changes of the detection signals Sa and Sb during the loading operation by the conveying roller DRV, and causes the conveying roller DRV to rotate in reverse direction so as to forcibly eject the adaptor ADP' from the insertion hole.

During this ejecting action by the driving roller DRV, supposing the user ignores this and carries out an unpredicted action, for example if he/she intends to forcibly pull out the adaptor ADP' but stops pulling and leaves the adaptor, or, if he/she blocks the adaptor ADP' being ejected, then the sensors may output detection signals Sa or Sb indicating that there is no adaptor ADP' in the conveying path between the insertion hole and the tray TR, whereupon the micro processor decides that the adaptor ADP' has been discharged, although it has actually not, and stops the ejecting operation, leaving the adaptor ADP' in the conveying path.

More specifically, as a result of the unpredicted action by the user, the adaptor ADP' may be stopped at a position where the optical sensor PD is located inside the adaptor's coupling portion, while the contact sensor MS is not in contact with the circumference of the adaptor ADP', as shown in FIG. 10A. If this happens, the detection signals Sa and Sb will remain the same logic values as those between the time points t2 and t3 for a long period of time as shown in FIG. 10C. If the detection signals Sa and Sb remain the same logic values even after a predetermined timeout has elapsed, the microprocessor may decide that the adaptor ADP' has already been discharged and stop the ejecting operation.

That is, because of the peculiar ring-like shape of the adaptor ADP', the detection signals Sa and Sb are logics "L" and "H" both between the time points t2 and t3 and before t1 as shown in FIG. 10C, and they cannot be distinguished from each other. Therefore, if the detection signals Sa and Sb remain as logics "L" and "H" respectively for a long period of time, the microprocessor may decide that there is no object or adaptor ADP' in the conveying path and terminates the ejecting operation.

FIG. 10B illustrates a situation similar to that shown in FIG. 10A, although with a different positional relationship between the adaptor ADP' and sensors PD and MS. The adaptor ADP' may be stopped as a result of the unpredicted action by the user at a position where the positional relationship is symmetric with that of FIG. 10A. In this case also, the microprocessor may stop the ejecting operation based on the determination that there is no object or adaptor ADP' in the conveying path.

More specifically, if the adaptor ADP' is positioned relative to the optical sensor PD and the contact sensor MS as shown in FIG. 10B, the detection signals Sa and Sb are the same logic values as those between the time points t4 and t5 in FIG. 10C, and because these cannot be distinguished from the logic values before the time point t1, the microprocessor will decide that there is no object or adaptor ADP' in the conveying path.

Although such situations as described above are unlikely to arise, it is nevertheless necessary to take account of any possible actions made by the user, and to take measures for preventing troubles resulting therefrom by ensuring that loading and unloading are always performed appropriately.

SUMMARY OF THE INVENTION

The present invention has been devised in view of the problems described above, and an object thereof is to provide an information recording medium conveyor having improved reliability.

To achieve the above object, according to a first aspect of the present invention there is provided an information recording medium conveyor for loading and unloading an information recording medium into and out of an information recording/reproducing device, including transport means capable of conveying an object including the information recording medium in both forward and backward directions; detecting means for detecting passage of the object including the information recording medium being conveyed by the transport means; open/close means for opening and closing an insertion/ejection part through which the object is inserted into and ejected from the information recording/reproducing device; and control means for controlling the transport means and the open/close means in accordance with signal outputs from the detecting means. The conveyor is characterized in that, during an ejecting or unloading operation, if the detecting means outputs a signal indicating that the object is not detected, the control means executes an instruction to the open/close means to close the insertion/ejection part, and if the open/close means fails to close the insertion/ejection part, the control means executes an instruction to the transport means to perform a forcible ejecting operation.

According to a second aspect of the invention, the conveyor is further characterized by having position detecting means for detecting an opening degree of the open/close means, and that the control means determines whether the open/close means has failed to close the insertion/ejection part based on output signals from the position detecting means.

According to the first and the second aspects of the present invention, during an ejecting or unloading operation, if a situation arises in which a detection signal is output from the detecting means indicating that no object can be detected, i.e., indicating that the object being ejected or unloaded has already been discharged to the outside and cannot be detected anymore although it has actually been not discharged yet, then an instruction is given to the open/close means to close the insertion/ejection part. If the open/close means fails to close the insertion/ejection part, the transport means carries out a forcible ejecting operation, whereby the object left inside is forcibly discharged from the insertion/ejection part. Thus, ejecting or unloading operation is performed without failure.

According to a third aspect of the invention, in the above information recording medium conveyor of the first aspect, the control means executes the instruction to the transport means to perform the forcible ejecting operation if the open/close means fails to close the insertion/ejection part within a predetermined duration of time.

Thereby, the forcible ejecting operation is carried out even during the open/close means is closing the insertion/ejection part, if it fails to completely close the insertion/ejection part within a predetermined time period. Thus, ejecting or unloading operation is performed without failure, and further troubles are prevented.

According to a fourth aspect of the present invention, in the above information recording medium conveyor of the first aspect, after completing the forcible ejecting operation, the control means causes the open/close means to remain closed after the open/close means has closed the insertion/ejection part.

Thereby, the forcible ejecting operation is completed in a state wherein the insertion/ejection part is closed by the open/close means.

According to a fifth aspect of the present invention, in the above information recording medium conveyor of the first aspect, after completing the forcible ejecting operation, the control means causes the open/close means to open and to remain opened after the open/close means has closed the insertion/ejection part.

Thereby, because the insertion/ejection part is opened after the ejecting operation, the user can readily insert another desired information recording medium from the insertion/ejection part, hence improved operability.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
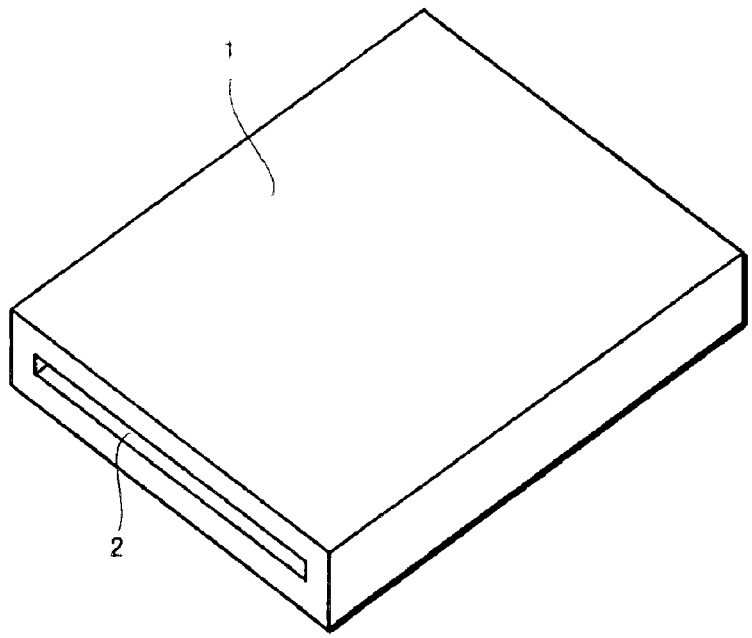
FIG. 1A and FIG. 1B illustrate the configuration of an information recording/reproducing device incorporating an information recording medium conveyor according to one embodiment of the present invention.
Figure 1:
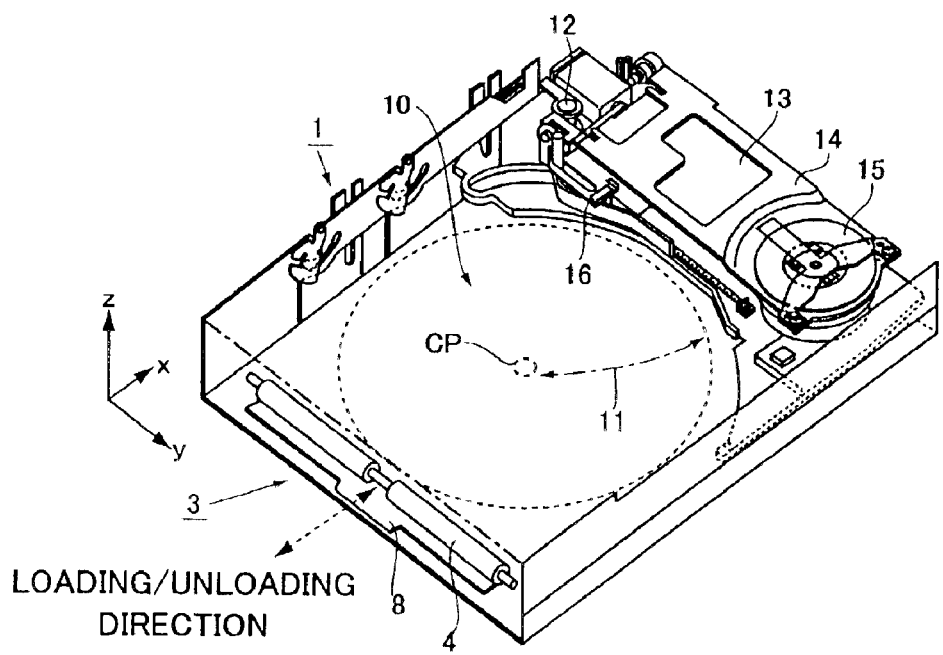
Figure 2:
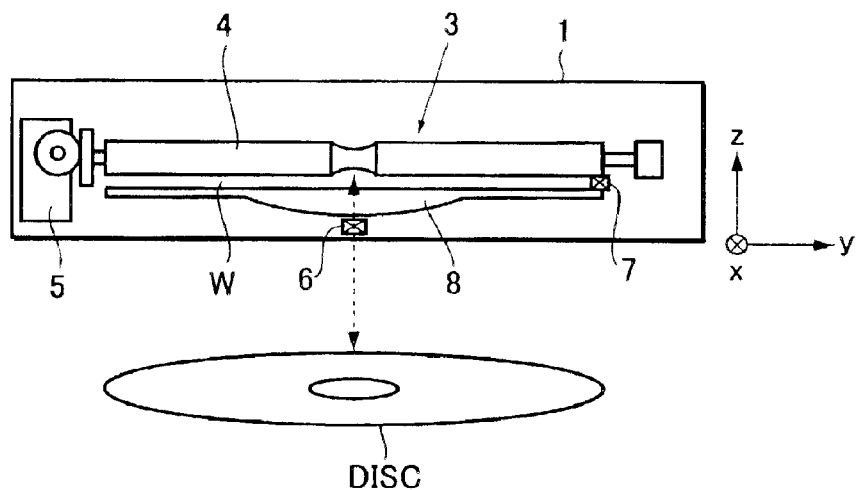
FIG. 2A to FIG. 2C illustrate the configuration of the information recording medium conveyor.
Figure 2:
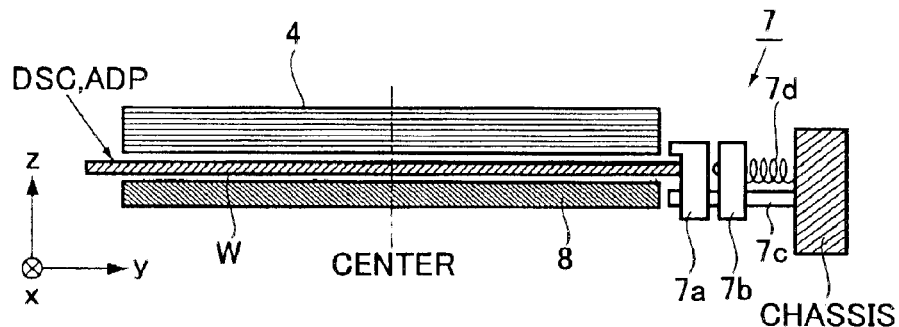
Figure 2:
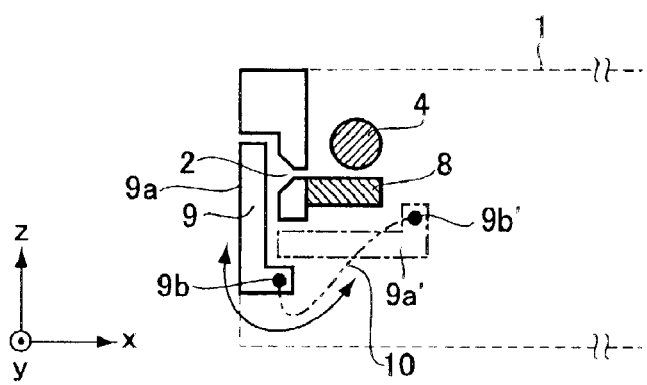
Figure 3:
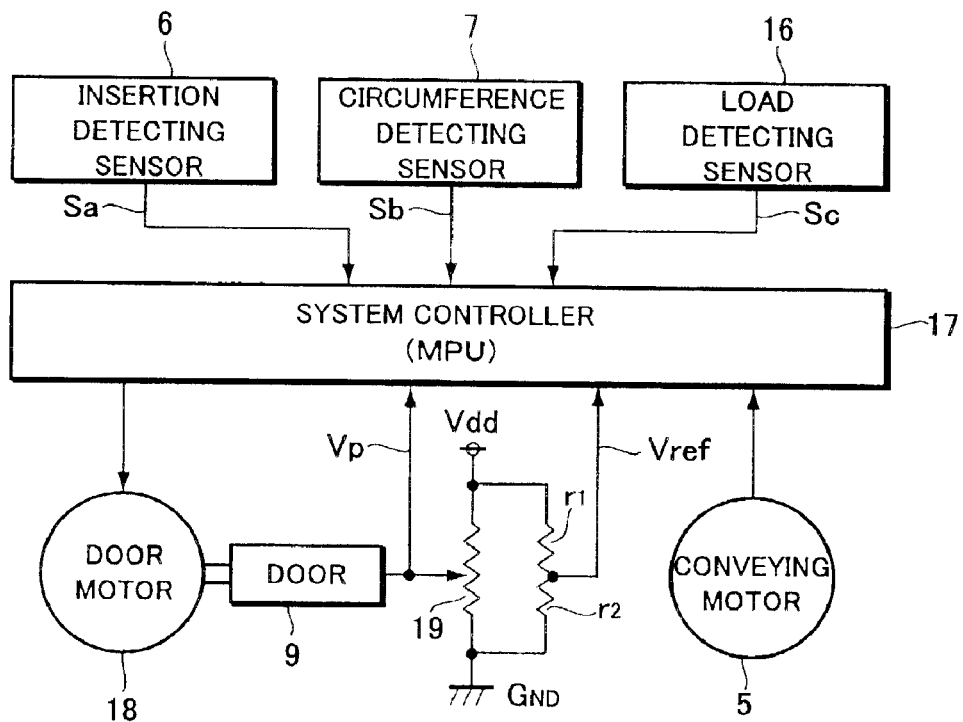
FIG. 3A is a block diagram illustrating a control circuit of the information recording medium conveyor.
FIG. 3B is a schematic illustration of the configuration of the conveyor.
Figure 3:
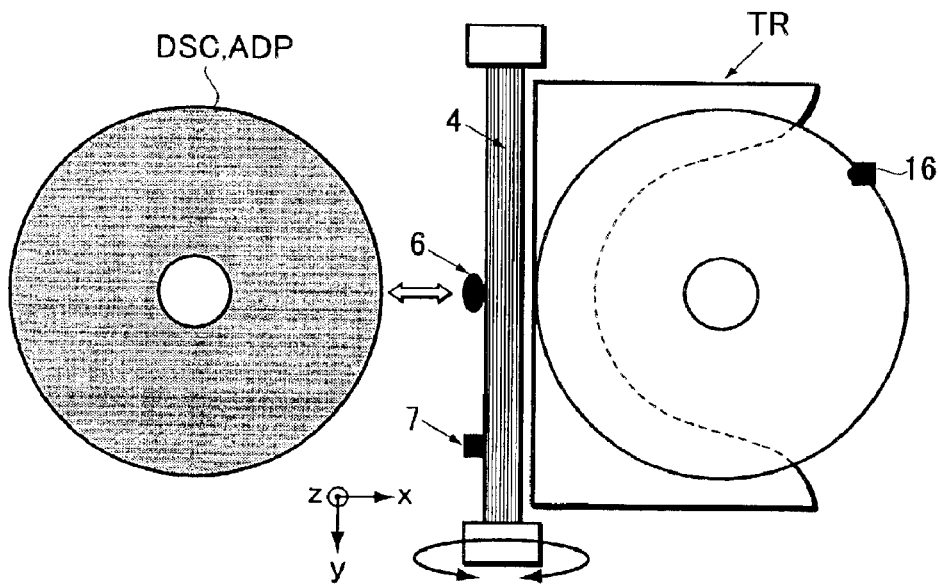

Preferred embodiments of the present invention will be hereinafter described with reference to the accompanying drawings. FIGS. 1A and 1B are schematic illustrations of the configuration of an information recording/reproducing device including an information recording medium conveyor according to one embodiment of the present invention. FIGS. 2A, 2B, and 2C illustrate the configuration of the information recording medium conveyor, and FIG. 3A is a block diagram of an electric circuit which constitutes the controller of the information recording medium conveyor.

The information recording/reproducing device 1 including the information recording medium conveyor 3 shown in FIG. 1A is designed as one component which is selectively assembled in a vehicular audio system or the like. It can handle both the standard large discs such as 12 cm diameter CDs and DVDs, and 8 cm diameter CDs which are mounted on 12 cm diameter ring-like adaptors to form quasi-discs.

For ease of description, both the large discs and discs with adaptors will be hereinafter referred to simply as "discs." The portion of the discs apart from the clamping hole will be referred to as "disc face." Portions other than the discs and the clamping hole of the disc, in other words, portions other than the disc face will be referred to as "non-disc face."

In the front face of the information recording/reproducing device 1 is formed an insertion hole 2 as an insertion/ejection part in the form of a slit for allowing a disc to be inserted. The insertion hole 2 or the slit has a height and width slightly larger than the thickness and diameter of discs.

When a disc is inserted into this insertion hole 2, the information recording medium conveyor 3 loads the disc into the information recording/reproducing device 1, whereas, when a foreign matter is inserted into the insertion hole 2, the conveyor 3 recognize it and ejects the same from the insertion hole 2. The insertion hole 2 doubles as an ejection hole for unloading a played disc to the outside of the information recording/reproducing device 1.

FIG. 1B illustrates the internal configuration of the information recording/reproducing device 1, and FIG. 2A shows the configuration of the information recording medium conveyor 3 viewed from the side of the insertion hole 2. As can be seen from these drawings, the conveyor 3 includes a conveying roller 4 provided as transport means disposed orthogonal to a loading/unloading direction x, and a motor 5 for rotating the conveying roller 4 in both directions via a gear mechanism (not shown).

Further, the conveyor 3 includes first detecting means or an insertion detecting sensor 6 comprising an optical sensor and disposed in a central position of the conveying roller 4, second detecting means or a circumference detecting sensor 7 comprising a mechanical microswitch or the like spaced apart from the insertion detecting sensor 6 by a certain distance on one side in a lengthwise direction y of the conveying roller 4, and a plate-like guide member 8 arranged opposite the roller face of the conveying roller 4 with a slight clearance W provided therebetween.

The conveying roller 4 and guide member 8 are disposed behind or at an inner location from the insertion hole 2, and the clearance W between the conveying roller 4 and guide member 8 is facing the insertion hole 2.

When a user inserts a desired disc into the insertion hole 2, the guide member 8 guides the disc into the clearance W. The disc is then held between the roller face of the conveying roller 4 and the guide member 8 and loaded into the device 1 by a driving force of the conveying roller 4 which is rotating in a forward direction.

The insertion detecting sensor 6 is located slightly nearer to the insertion hole 2 than the clearance W between the conveying roller 4 and guide member 8, its position coinciding with the center of the conveying roller 4 in its lengthwise direction y.

Therefore, when a disc is inserted from the insertion hole 2, the distal end of the disc face is first detected by the insertion detecting sensor 6. As the disc is loaded into or out of the device 1, the moving track of the disc face and clumping hole along the center axis is optically detected.

The circumference detecting sensor 7 comprising a microswitch and the like is spaced away from the insertion detecting sensor 6 by a predetermined distance in a range of from the radius of smaller discs of about 8 cm diameter to the radius of large discs of about 12 cm diameter.

The circumference detecting sensor 7 includes, as shown in FIG. 2B, a support shaft 7c protruded on a portion of the chassis or the like of the conveyor 3 along the lengthwise direction of the conveying roller 4, a movable member 7a and microswitch 7b supported on the support shaft 7c such as to be capable of advancing and retracting, a resilient member 7d such as a spring arranged between the microswitch 7b and chassis or the like for resiliently biasing the backside of the microswitch 7b.

The movable member 7a is a small and lightweight member made of plastic or the like, and the length of the resilient member 7d is determined such that this movable member 7a at the front of the microswitch 7b is located in a position spaced away from the insertion detecting sensor 6 by the distance determined based on the radii of the smaller and larger discs.

When a large disc DSC or a disc ADP with an adaptor having a larger radius than the distance between the insertion detecting sensor 6 and the movable member 7a is loaded into or out of the device 1 by the conveying roller 4, from the time when their circumferential portion comes into sliding contact with the movable member 7a and during the time when the movable member 7a moves toward the microswitch 7b in accordance with the circular contour of the disc circumference, a detection signal Sb of a logic "L" is output from the microswitch 7b. As the disc DSC or ADP moves along, the movable member 7a and microswitch 7b move forward to the center of the conveying roller 4 by the biasing force of the resilient member 7d, until they stop at positions spaced away the determined distance from the insertion detecting sensor 6.

Thus, the microswitch 7b outputs a logic signal "L" of detection signal Sb indicating that a disc face has been detected when the movable member 7a comes into sliding contact with a circumferential portion of a large disc DSC or a disc ADP with an adaptor. When the movable member 7a separates from the circumference of the disc DSC or ADP, the microswitch 7b outputs a detection signal Sb, a logic "H," indicating that a non-disc face has been detected.

Although not shown in FIG. 1A, the insertion hole 2 is provided with a door 9 shown in FIG. 2C.

As can be seen from the side view of FIG. 2C, the door 9 is made up of a plate 9a for covering the front of the slit-like insertion hole 2, a pair of projections 9b standing at both ends of the plate 9a in the direction y. These projections 9b are loosely fitted in cam grooves (not shown) of a predetermined shape respectively formed in both side walls of the information recording/reproducing device 1.

A motor (not shown) for moving the door 9 along the cam grooves noted above is also provided inside the information recording/reproducing device 1.

Actuating this motor, the door 9 in a state of closing the insertion hole 2 is moved to its open position. As the projections 9b are guided by the cam grooves along a path indicated by the broken line 10 in FIG. 2C to a position denoted at 9b', the plate 9a moves downwards and rotates outwards to a retracted position denoted at 9a'.

When this door motor is activated in a state where the door 9 is retracted at the position indicated by 9a', 9b', i.e., when the insertion hole 2 is open, the projections 9b move back along the path indicated by the broken line 10, while the plate 9a rotates outwards and moves upwards in the direction z. The motor drive stops when the door 9 has come to a position where it completely closes the insertion hole 2.

In a central portion 10 of the information recording/reproducing device 1 is accommodated a disc changer mechanism having a plurality of trays TR on which a plurality of discs DSC or ADP can be loaded (see FIG. 1B). Behind the disc changer mechanism is a pickup mechanism 13 which can turn around a support shaft 12 as indicated by an imaginary line 11 in the drawing.

The pickup mechanism 13 includes an arm 14 made of metal and rotatably supported on the support shaft 12, and a clamping mechanism 15 provided at the distal end of the arm 14 for holding a clamping portion CP of disc DSC or ADP.

The clamping mechanism 15 has a motor (not shown) for rotating the disc DSC or ADP held thereby in a predetermined direction at a constant line speed. The arm 14 includes a carriage mechanism (not shown), which is provided with an optical pickup (not shown) which moves forward and backward along the direction of the radius of the disc.

The pickup mechanism 13 is initially retracted at the back of the information recording/reproducing device 1. When information is to be reproduced or recorded, a system controller 17, which will be described later, turns the pickup mechanism 13 toward the clamping portion CP of the disc loaded on the tray TR in the disc changer mechanism for holding the disc, and activates the optical pickup system.

The system controller 17 effects control such that the pickup mechanism 13 is turned away to its waiting position at the back of the information recording/reproducing device 1 when no reproduction or recording is performed or during a disc DSC or a disc ADP with an adaptor is loaded into or out of the disc changer mechanism by the conveyor 3.

At a given location on the arm 14 is provided a load detecting sensor 16 comprising a microswitch or an optical sensor. In a state where the pickup mechanism 13 is turned away at the back of the information recording/reproducing device 1, when a disc DSC or a disc ADP with an adaptor is loaded into the carriage mechanism by the conveyor 3, the load detecting sensor 16 detects one end of the disc DSC or ADP loaded on any one of the trays TR in the carriage mechanism, and outputs a detection signal Sc indicating that loading has been completed.

In a predetermined location inside the information recording/reproducing device 1 is provided an electric circuit substrate incorporating the system controller 17 which controls the overall operation of the device 1 as well as the operation of the conveyor 3.

As illustrated in the block diagram of FIG. 3A, the system controller 17 includes a micro processor unit (MPU) for controlling the information recording/reproducing device 1 and the conveyor 3. It runs a preset system program for monitoring every detection signal Sa, Sb, and Sc output from the insertion detecting sensor 6, the circumference detecting sensor 7, and the load detecting sensor 16, respectively, and for controlling the drive of the motor 5 for the conveying roller and the motor 18 for the door in accordance with the changes in the signals Sa, Sb, and Sc.

The electric circuit substrate also includes a position detecting sensor 19 comprising a variable resistor or the like for detecting the height of the door 9 relative to the insertion hole 2. Position detection signals Vp output from the position detecting sensor 19 are constantly monitored by the system controller 17.

The variable resistor provided as the position detecting sensor 19 is connected across a power source voltage Vdd and ground GND, and includes a variable contact which causes a bias as the door 9 moves. When the system controller 17 actuates the door motor 18 for opening or closing the door 9, the variable contact generates the position detection signal Vp indicating the voltage value corresponding to the movement amount of the door 9. This position detection signal Vp is constantly monitored by the system controller 17.

Resistors r1 and r2 are connected in series across the power source voltage Vdd and ground GND, which generate a predetermined reference voltage Vref. The system controller 17 compares the voltage value given by the position detection signal Vp with this reference voltage Vref and determines the amount of movement of the door 9, i.e., how much the insertion hole 2 is opened/closed by the door 9.

The reference voltage Vref is set the same voltage value as a position detection signal Vp which is output when the insertion hole 2 is completely closed by the door 9. Thus, the system controller 17 can determine how much the insertion hole 2 is opened or closed by the door 9 based on the difference between the reference voltage Vref and the position detection signal Vp (Vref−Vp).

To sum up, the information recording medium conveyor 3 is constructed as follows: The conveying roller 4 provided as transport means is arranged orthogonal to the loading/unloading direction, and the insertion detecting sensor 6 and the circumference detecting sensor 7 are disposed along this conveying roller 4. Behind the conveying roller 4 in the loading direction is provided the load detecting sensor 16 and the rotatable pickup mechanism 13, with the disc changer mechanism having a plurality of trays TR interposed therebetween (see the top plan view of FIG. 3B).

The system controller 17 shown in FIG. 3A controls the motor 5 for the conveying roller and the door motor 18 in accordance with the detection signals Sa, Sb, and Sc from the sensors 6, 7, and 16, and the position detection signal Vp from the position detecting sensor 19.

The operation of the information recording medium conveyor 3 will be described below with reference to FIGS. 4A–4I and FIG. 5.

Figure 4:
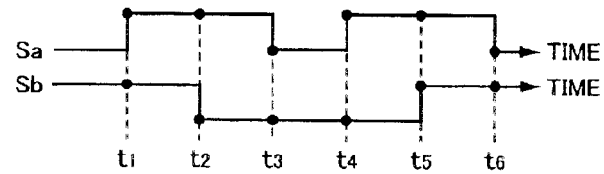
FIG. 4A to FIG. 4I are diagrams illustrating changes in the detection signals output from an insertion detecting sensor and a circumference detecting sensor in respective cases where a large disc or a disc with an adaptor, an adaptor, and a small disc are conveyed.
Figure 4:
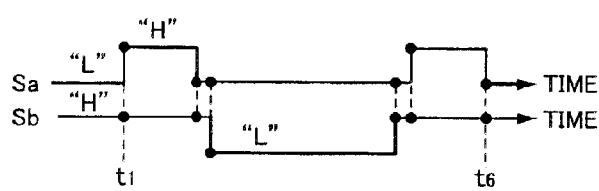
Figure 4:
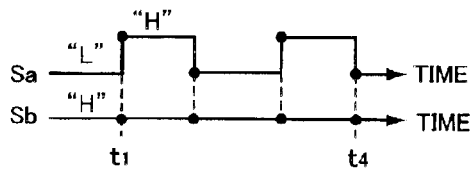

FIG. 4A to FIG. 4C are diagrams illustrating the changes in the detection signals Sa and Sb output from the insertion detecting sensor 6 and the circumference detecting sensor 7 when a large disc DSC or a disc ADP with an adaptor is loaded by the conveying roller 4.

FIG. 4D to FIG. 4F are diagrams illustrating the changes in the detection signals Sa and Sb in an imaginary case where an adaptor ADP' alone is wrongly loaded by the conveying roller 4.

FIG. 4G to FIG. 4I are diagrams illustrating the changes in the detection signals Sa and Sb in an imaginary case where a small disc DSC' is wrongly loaded by the conveying roller 4.

The system controller 17 causes the door 9 to be opened upon receiving an instruction from the user. FIG. 4A shows a state where a large disc DSC or a disc ADP with an adaptor has just been inserted into the insertion hole 2. The conveying roller 4 starts rotating in forward direction from the time point t1 so as to load the disc DSC or ADP, and the detection signals Sa and Sb change in normal sequence shown in FIG. 4C in accordance with the movement of the disc being loaded. After the time point t6 at which the disc DSC or ADP comes out of the scope of the sensors 6 and 7 as shown in FIG. 4B, when a detection signal Sc is output from the load detecting sensor 16, indicating that the disc DSC or ADP has been loaded in one of the trays TR, the conveying roller 4 is stopped and the loading operation is finished.

Unloading the disc DSC or ADP carried in one of the trays TR is performed in reverse sequence from the state shown in FIG. 4B to the state shown in FIG. 4A, i.e., the door 9 is opened, the conveying roller 4 is rotated in reverse direction, and the disc DSC or ADP is ejected from the insertion hole 2. The unloading operation is finished when the door 9 is closed.

If an adaptor ADP' alone is inserted as shown in FIG. 4D or if a small disc DSC' is inserted as shown in FIG. 4G, then the system controller 17 determines that the detection signals Sa and Sb are not changing in normal sequence, and causes the conveying roller 4 to stop and to reverse the rotating direction, whereby the adaptor ADP' or small disc DSC' is ejected as with a foreign matter.

Also if the detection signals Sa and Sb are not changing in normal sequence because of some abnormality or the like during the loading of a large disc DSC or a disc ADP with an adaptor, the conveying roller 4 reverses the rotating direction to eject the disc.

The system controller 17 thus instructs to eject the disc whenever the changes in the detection signals Sa, Sb do not follow the normal sequence during the loading operation, so as to prevent further troubles.

If, however, the user forcibly pulls out or blocks the movement of the disc DSC, ADP, DSC' or adaptor ADP' being ejected or unloaded, ignoring the operation of the conveyor 3, then the detection signals Sa and Sb may remain as logics "L" and "H," respectively. This means that the system controller 17 determines that the ejecting or unloading operation has been finished although it has actually not, and instructs the conveying roller 4 to stop rotating.

In other words, if the detection signals Sa and Sb remain as logics "L" and "H", respectively, after a predetermined time has passed because of an unpredicted operation by the user during the ejecting or unloading action, the system controller 17 determines that a state has been reached where there is no object in the conveying path between the insertion hole 2 and the trays TR and that the conveying roller 4 must be stopped.

Figure 5:
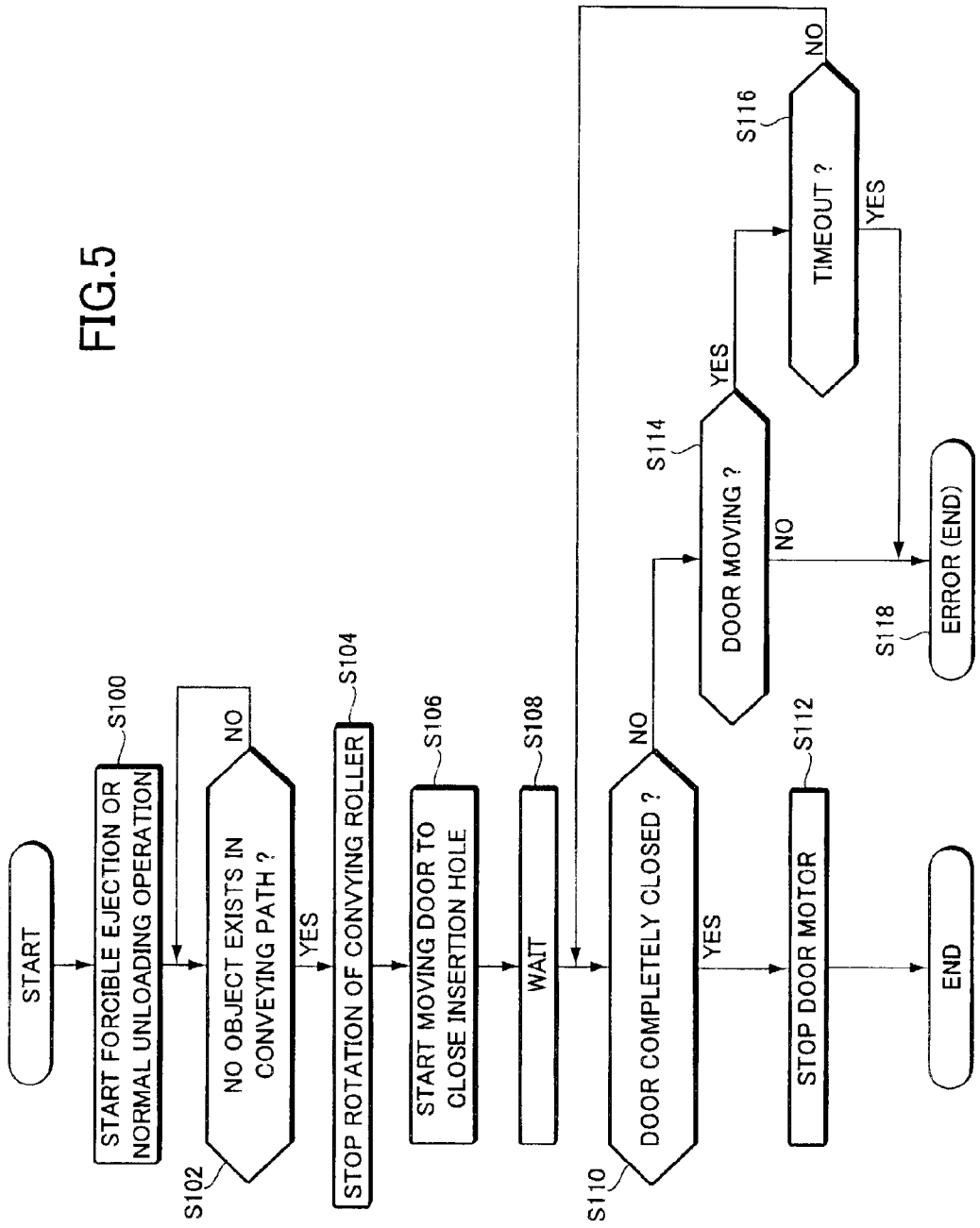
FIG. 5 is a flow chart of the operation of the information recording medium conveyor of the present invention.
Figure 6:
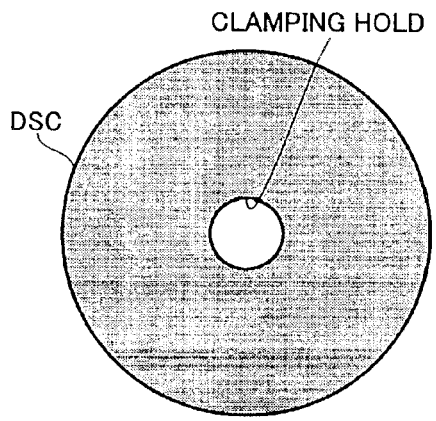
FIG. 6A to FIG. 6E illustrate the configuration of a conventional information recording medium conveyor.
Figure 6:
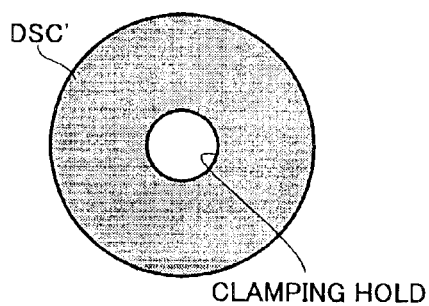
Figure 6:
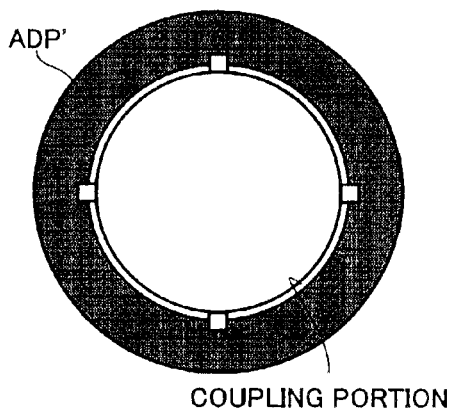
Figure 6:
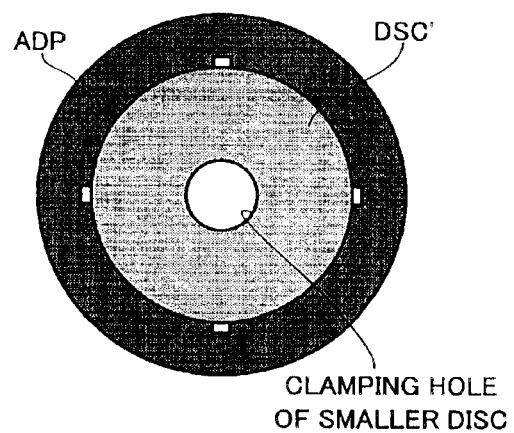
Figure 6:
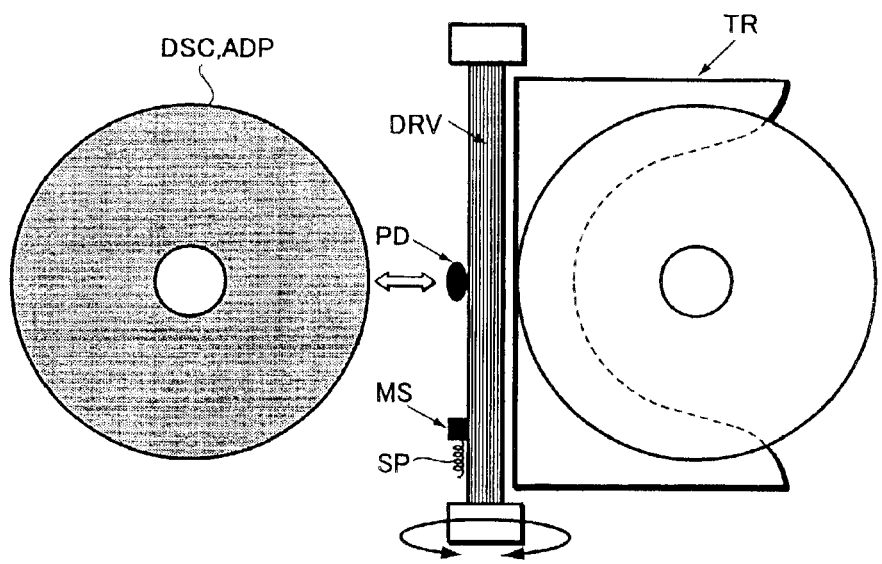
Figure 7:
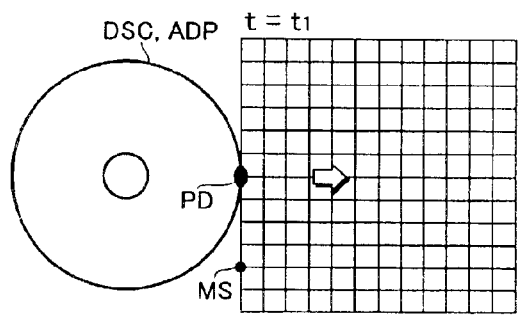
FIG. 7A to FIG. 7G are diagrams for explaining the operation of the conventional information recording medium conveyor.
Figure 7:
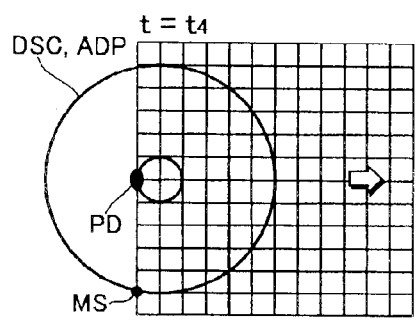
Figure 7:
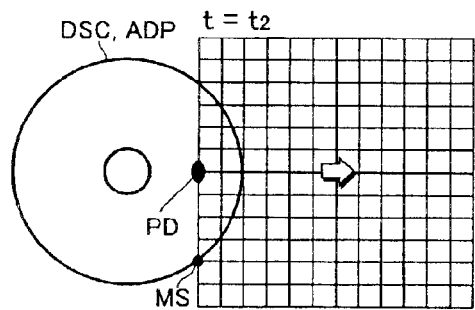
Figure 7:
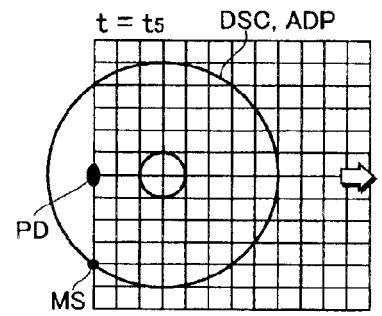
Figure 7:
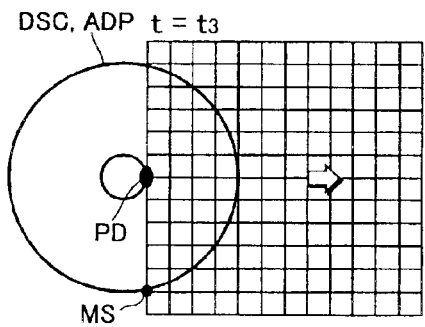
Figure 7:
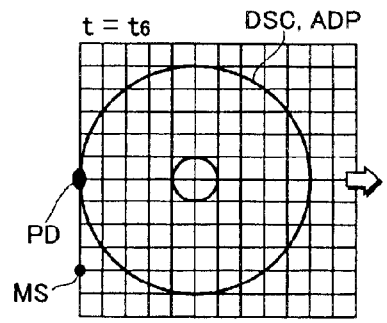
Figure 7:
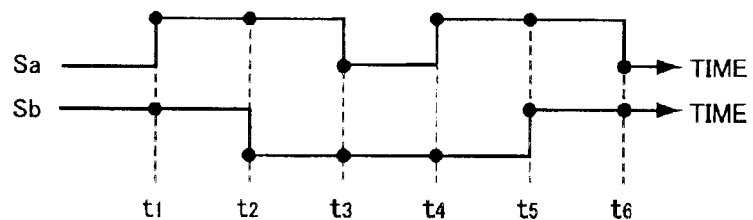
Figure 8:
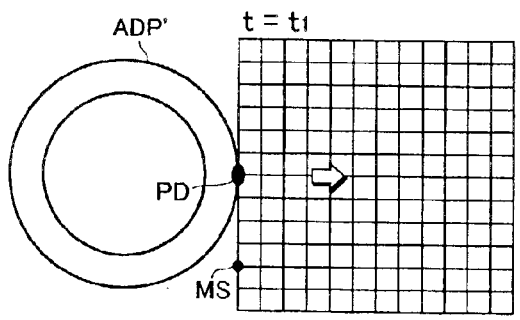
FIG. 8A to FIG. 8G are diagrams given for further explanation of the operation of the conventional information recording medium conveyor.
Figure 8:
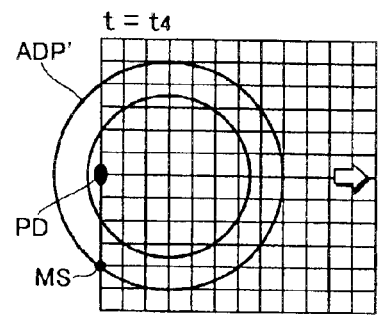
Figure 8:
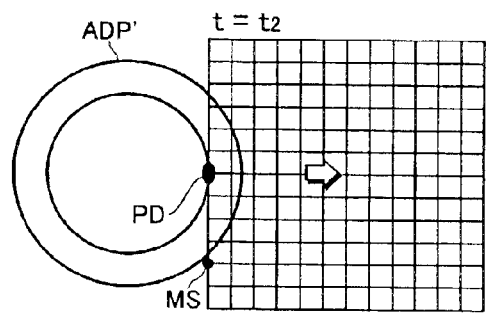
Figure 8:
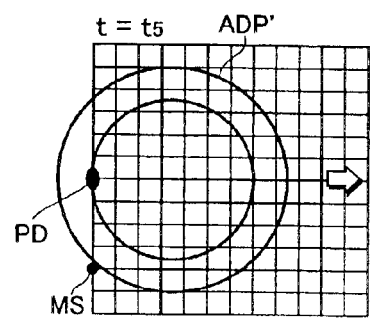
Figure 8:
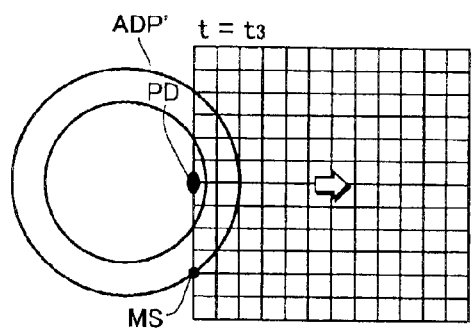
Figure 8:
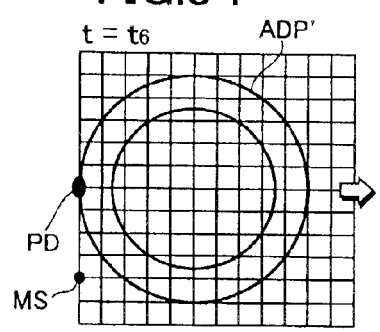
Figure 8:
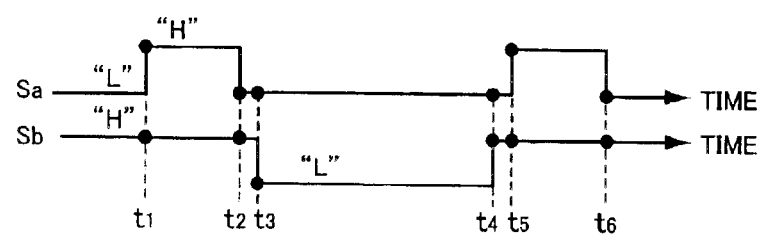
Figure 9:
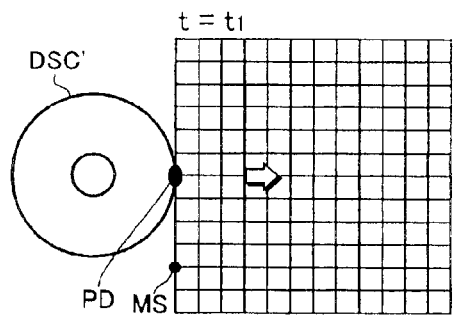
FIG. 9A to FIG. 9E are diagrams given for further explanation of the operation of the conventional information recording medium conveyor.
Figure 9:
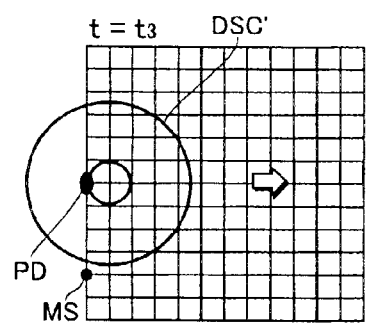
Figure 9:
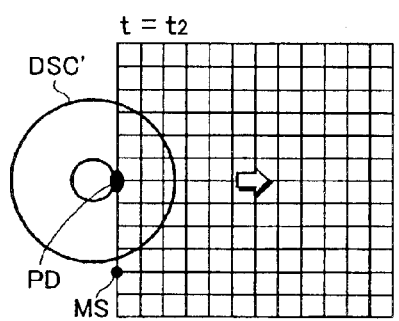
Figure 9:
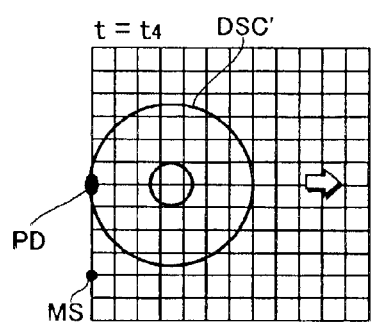
Figure 9:
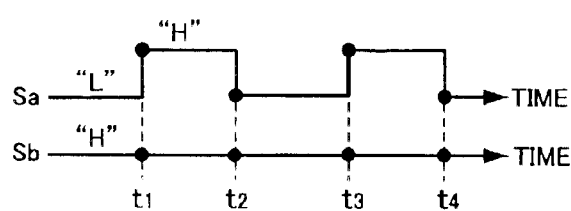
Figure 10:
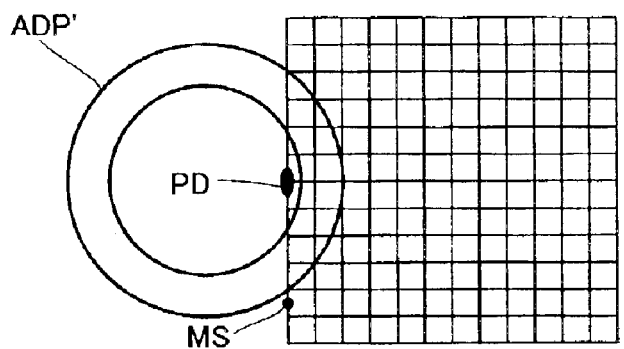
FIG. 10A to FIG. 10C are diagrams given for explaining the problems in the conventional information recording medium conveyor.
Figure 10:
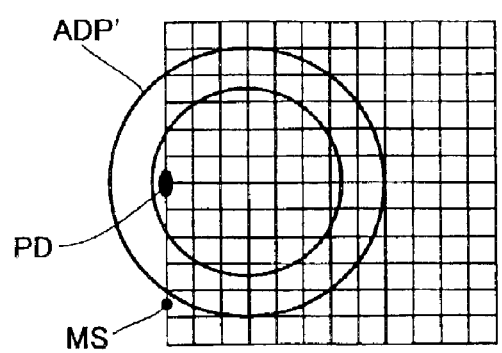
Figure 10:
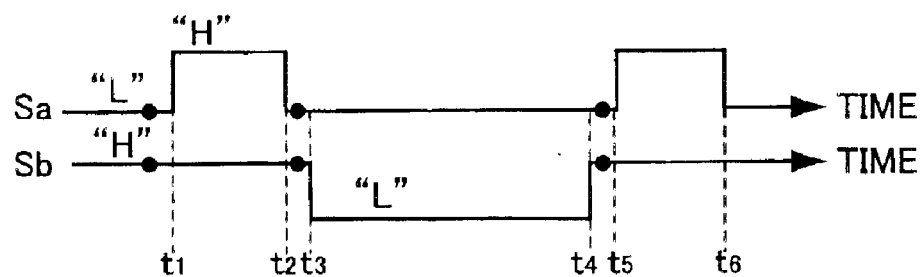

Therefore, in order that a disc DSC, ADP, DSC' or an adaptor ADP' is not left in the conveying path, the ejecting or normal unloading operation is carried out as shown in the flow chart of FIG. 5.

Referring now to FIG. 5, after starting the reverse rotation of the conveying roller 4 for ejecting or normal unloading of a disc at step S100, the system controller 17 constantly monitors all through the duration of the ejecting or unloading (S102) whether a detection signal Sa or Sb has been output, which indicates that no object is present in the conveying path.

When detection signals Sa or Sb are output, which indicate that no object is present in the conveying path, or in other words, when the detection signals Sa and Sb become the logics "L" and "H." respectively, whereupon the system controller 17 determines that a state has been achieved where no object is present in the conveying path, the operation proceeds to the next step S104.

The conveying roller 4 is stopped at step S104, and the door motor 18 is activated at the next step S106 to cause the door 9 to close the insertion hole 2.

At step S108, the system controller 17 waits for a predetermined duration of time required for the door 9 to be closed, and determines at the next step S110 whether the door 9 has completely been closed. The system controller 17 compares the voltage of the position detection signal Vp output from the position detecting sensor 19 with the reference voltage Vref. If the voltage difference Vref–Vp is zero, it decides that the door 9 is completely closed. If the voltage difference Vref–Vp is more than zero, it decides that the door 9 has not been closed yet.

When the system controller 17 determines that the door 9 is completely closed, it concludes that the ejecting or normal loading operation has been carried out successfully and that there is now no object present in the conveying path. The operation thus proceeds to the next step S112.

At step S112, the door motor 5 is stopped, and the ejecting or normal unloading operation is finished in a state where the insertion hole 2 is closed by the door 9.

In this embodiment, the door 9 remains closed after step S112, and if the user wishes to insert another desired large disc DSC or another disc ADP with an adaptor, he/she needs to perform an action to cause the system controller 17 to open the door 9 again. The present invention is of course not limited to this setting and may be modified such that the ejection operation is finished in a state where the door 9 is opened again at step S112.

Such setting whereby the door 9 is opened after the ejecting operation can offer good operability because the user can readily insert again a desired disc DSC or ADP.

At step S110 mentioned above, if the system controller 17 determines that the door 9 is not completely closed, then the next step S114 is to determine whether the door 9 is moving or not.

The system controller 17 checks if there is a change in the voltage difference Vref–Vp per unit time, decides that the door 9 is not moving if there is no change in the voltage difference, and proceeds to step S118 where necessary measure is taken to deal with the error. In other words, the system controller 17 determines that the ejecting or normal unloading operation has resulted in a state where a disc DSC, ADP or other object is stopped at the insertion hole 2, partly protruding to the outside, because of which the door 9 remains motionless, not capable of closing the insertion hole 2. Thus, it proceeds to step S118 to deal with the error.

If there is a change in the voltage difference Vref–Vp and it is determined that the door 9 is moving at step S114, the system controller 17 proceeds to step S116 where it determines whether a preset timeout duration has passed, i.e., whether the timeout duration which starts from the completion of step S108 has elapsed. If no, the operation goes back to step S110 and proceeds.

The operation goes back to step S110, and if it is determined at step S114, before the timeout duration has elapsed, that the door 9 is not moving, the operation proceeds to the error recovery step S118, and if it is determined at step S116 that the timeout duration has elapsed, the operation also proceeds to the error recovery step S118.

In other words, at step S114, it is recognized that an abnormal situation has arisen where the door 9 is not moving, even before the lapse of timeout duration, and at step S116, it is recognized that, even if the door 9 is moving, there is some abnormality in that movement. Thus, various situations are identified as abnormalities, whereby the reliability of the conveyor 3 is improved.

The error recovery operation of step S118 is carried out as follows. The door motor 18 is activated to fully open the door 9, after which the conveying roller 4 is rotated in reverse direction again for a predetermined, relatively long, duration of time so as to forcibly eject whatever is inside.

After the forcible ejection, the process starts again from step S106, and if it is determined that the door 9 is closed at step S110, it is judged that the forcible ejection was performed successfully, whereupon the forcible ejection is finished.

If the system controller 17 judges that the normal state has still not been recovered after the forcible ejection, it stops the conveying roller 4, causes an alarm indication to appear on an operation panel or the like (not shown) with the door 9 kept closed, and finishes all actions relating to loading and unloading.

According to the present invention, even if a situation arises in which an object is left in the conveying path even after a predetermined time has passed resulting from an unpredicted operation by the user during the ejecting or normal unloading operation, it is dealt with based on detection of the movement of the door 9, and the object is forcibly ejected from the insertion hole 2. Thus, the information recording medium conveyor of the present invention operates with high reliability.

The forcible ejection of the object left in the conveying path is carried out without providing any additional, complex or special, mechanism. Therefore, the present invention offers various advantages such as reduction in the number of components, downsizing of the device, and lower costs.

In the embodiment described above, the circumference detecting sensor 7 comprises a microswitch and it is brought into sliding contact with a large disc DSC or a disc ADP with an adaptor for detecting the track of its circumference, but the present invention is not limited to this arrangement.

For example, an optical sensor comprising an emitter and a receiver may be employed instead of the microswitch for non-contact detection of the track of the disc face on the outer circumferential side of a disc DSC or ADP.

The transport means in this embodiment is constituted by the conveying roller 4 which rotates to produce a drive force for conveying the disc. The present invention is obviously not limited to this arrangement and any other transport means capable of conveying a large disc DSC or a disc ADP with an adaptor may be employed.

As described above, the information recording medium conveyor of the present invention has the following characteristic features. Supposing a situation arises, during an ejecting or unloading operation, in which a detection signal is output indicating that the object being ejected or unloaded has already been discharged to the outside and cannot be detected anymore although it has actually been not, an instruction is given to close the door, and if the door fails to close, the transport means carries out a forcible ejecting operation, whereby the object left inside is forcibly discharged. By thus ensuring successful disc ejecting or unloading operation, the information recording medium conveyor of the present invention operates with higher reliability.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording medium conveyor for loading and unloading an information recording medium into and out of an information recording/reproducing device, comprising:

transport means capable of conveying an object including said information recording medium in both forward and backward directions;

detecting means for detecting passage of said object including said information recording medium being conveyed by said transport means;

open/close means for opening and closing an insertion/ejection part through which said object is inserted into and ejected/unloaded from the information recording/reproducing device; and control means for controlling said transport means and said open/close means in accordance with output signals from said detecting means, wherein if, during an ejecting or unloading operation, said detecting means outputs a signal indicating that said object is not detected, said control means executes an instruction to said open/close means to close said insertion/ejection part, and if said open/close means fails to close said insertion/ejection part, said control means executes an instruction to said transport means to perform a forcible ejecting operation.

2. The information recording medium conveyor according to claim 1, further comprising position detecting means for detecting an opening degree of said insertion/ejection part, wherein said control means determines whether said open/close means has failed to close said insertion/ejection part based on output signals from said position detecting means.

3. The information recording medium conveyor according to claim 1, wherein said control means executes the instruction to said transport means to perform the forcible ejecting operation if said open/close means fails to close said insertion/ejection part within a predetermined duration of time.

4. The information recording medium conveyor according to claim 1, wherein, after completing said forcible ejecting operation, said control means causes said insertion/ejection part to remain closed after said open/close means has closed said insertion/ejection part.

5. The information recording medium conveyor according to claim 1, wherein, after completing said forcible ejecting operation, said control means causes said insertion/ejection part to open and to remain opened after said open/close means has closed said insertion/ejection part.

6. An information recording medium conveyor for loading and unloading an information recording medium into and out of an information recording/reproducing device, comprising:

a transporter capable of conveying an object including said information recording medium in both forward and backward directions;

a detector for detecting passage of said object including said information recording medium being conveyed by said transporter;

an actuator for opening and closing an insertion/ejection part through which said object is inserted into and ejected/unloaded from the information recording/reproducing device; and a controller for controlling said transporter and said actuator in accordance with output signals from said detector, wherein if, during an ejecting or unloading operation, said detector outputs a signal indicating that said object is not detected, said controller executes an instruction to said actuator to close said insertion/ejection part, and if said actuator fails to close said insertion/ejection part, said controller executes an instruction to said transporter to perform a forcible ejecting operation.

7. The information recording medium conveyor according to claim 6, further comprising a position detector for detecting an opening degree of said insertion/ejection part, wherein said controller determines whether said actuator has failed to close said insertion/ejection part based on output signals from said position detector.

8. The information recording medium conveyor according to claim 6, wherein said controller executes the instruction to said transporter to perform the forcible ejecting operation if said actuator fails to close said insertion/ejection part within a predetermined duration of time.

9. The information recording medium conveyor according to claim 6, wherein, after completing said forcible ejecting operation, said controller causes said insertion/ejection part to remain closed after said actuator has closed said insertion/ejection part.

10. The information recording medium conveyor according to claim 6, wherein, after completing said forcible ejecting operation, said controller causes said insertion/ejection part to open and to remain opened after said actuator has closed said insertion/ejection part.

11. An information recording medium conveyor for conveying an information recording medium into and out of an information recording/reproducing device, comprising:

a transporter capable of conveying an object including said information recording medium in both forward and backward directions;

a detector for detecting passage of said object including said information recording medium being conveyed by said transporter;

an actuator for opening and closing an opening through which said object is passed; and a controller for controlling said transporter and said actuator in accordance with output signals from said detector, wherein if, during a conveying operation, said detector outputs a signal indicating that said object is not detected, said controller executes an instruction to said actuator to close said opening, and if said actuator fails to close said opening, said controller executes an instruction to said transporter to perform a forcible ejecting operation.

12. The information recording medium conveyor according to claim 11, further comprising a position detector for detecting an opening degree of said opening, wherein said controller determines whether said actuator has failed to close said opening based on output signals from said position detector.

13. The information recording medium conveyor according to claim 11, wherein said controller executes the instruction to said transporter to perform the forcible ejecting operation if said actuator fails to close said opening within a predetermined duration of time.

14. The information recording medium conveyor according to claim 11, wherein, after completing said forcible ejecting operation, said controller causes said opening to remain closed after said actuator has closed said opening.

15. The information recording medium conveyor according to claim 11, wherein, after completing said forcible ejecting operation, said controller causes said opening to open and to remain opened after said actuator has closed said opening.

* * * * *